United States Patent
Kluy et al.

(10) Patent No.: US 12,537,214 B2
(45) Date of Patent: Jan. 27, 2026

(54) KIT FOR A FUEL CELL STACK AND METHOD FOR PRODUCING A FUEL CELL STACK

(71) Applicant: AUDI AG, Ingolstadt (DE)

(72) Inventors: Norbert Kluy, Schernfeld (DE); Markus Gretzer, Eichstätt (DE)

(73) Assignee: AUDI AG, Ingolstadt (DE)

( * ) Notice: Subject to any disclaimer, the term of this patent is extended or adjusted under 35 U.S.C. 154(b) by 597 days.

(21) Appl. No.: 17/775,855

(22) PCT Filed: Feb. 11, 2021

(86) PCT No.: PCT/EP2021/053269
§ 371 (c)(1),
(2) Date: May 10, 2022

(87) PCT Pub. No.: WO2021/175553
PCT Pub. Date: Sep. 10, 2021

(65) Prior Publication Data
US 2022/0416285 A1    Dec. 29, 2022

(30) Foreign Application Priority Data
Mar. 6, 2020   (DE) .................. 10 2020 106 091.2

(51) Int. Cl.
*H01M 8/2485* (2016.01)
*H01M 8/0267* (2016.01)
(Continued)

(52) U.S. Cl.
CPC ....... *H01M 8/2485* (2013.01); *H01M 8/0267* (2013.01); *H01M 8/1004* (2013.01); *H01M 8/249* (2013.01)

(58) Field of Classification Search
None
See application file for complete search history.

(56) References Cited

U.S. PATENT DOCUMENTS

| 8,227,132 B2 | 7/2012 | Kim et al. |
| 2004/0247982 A1 | 12/2004 | Sabin et al. |

(Continued)

FOREIGN PATENT DOCUMENTS

| DE | 102010011206 A1 | 9/2011 |
| DE | 102014220682 A1 | 4/2016 |

(Continued)

OTHER PUBLICATIONS

English translation of International Preliminary Report on Patentability for International Application No. PCT/EP2021/053269, dated Sep. 6, 2022. (7 pages).

*Primary Examiner* — Alix E Eggerding
(74) *Attorney, Agent, or Firm* — Seed Intellectual Property Law Group LLP

(57) ABSTRACT

A kit for a fuel cell stack comprises a first plurality of unit cells of the same design, which can be stacked on top of each other in a stacking direction and which each have one or more media channels and a membrane electrode assembly, the membrane electrode assembly comprising a cathode, an anode, and a membrane arranged between the cathode and the anode, a first media guide, which can be laterally connected to the first plurality of unit cells and runs parallel to the stacking direction, having a first usable flow cross section, in order to guide a medium into or out from the media channels of the unit cells of the first plurality of unit cells substantially laterally with respect to the stacking direction, a second plurality of unit cells of the same design, and a second media guide, which can be connected laterally to the two pluralities of unit cells stacked on top of one another and running parallel to the stacking direction, having a second usable flow cross section, different from the first usable flow cross section, in order to guide a medium into or out from the media channels of the unit cells of the two pluralities of unit cells substantially laterally to the (Continued)

stacking direction. A method for production of a fuel cell stack of a fuel cell device is also provided.

10 Claims, 6 Drawing Sheets

(51) Int. Cl.
*H01M 8/1004* (2016.01)
*H01M 8/249* (2016.01)

(56) References Cited

U.S. PATENT DOCUMENTS

| | | | |
|---|---|---|---|
| 2011/0244353 A1 | 10/2011 | Chou et al. | |
| 2011/0269042 A1* | 11/2011 | Schneider | H01M 8/249 |
| | | | 429/434 |
| 2012/0122008 A1 | 5/2012 | Ko et al. | |
| 2014/0272612 A1* | 9/2014 | Trevisan | H01M 8/04014 |
| | | | 429/408 |

FOREIGN PATENT DOCUMENTS

| | | | |
|---|---|---|---|
| DE | 102017210263 A1 | | 12/2018 |
| DE | 102018208981 A1 | | 12/2019 |
| JP | S6039773 A | | 3/1985 |
| JP | S6149382 A | | 3/1986 |
| JP | H02226669 A | | 9/1990 |
| JP | 2008041475 A | * | 2/2008 |
| JP | 2012256498 A | * | 12/2012 |
| KR | 20080076206 A | | 8/2008 |

* cited by examiner

KIT FOR A FUEL CELL STACK AND METHOD FOR PRODUCING A FUEL CELL STACK

BACKGROUND

Technical Field

Embodiments of the invention relate to a kit for a fuel cell stack and a method for producing a fuel cell stack of a fuel cell device.

Description of the Related Art

Fuel cell devices are used for the chemical transformation of a fuel with oxygen to form water, in order to generate electric energy. For this, fuel cells contain as their key component a so-called membrane electrode assembly, which is formed from a proton-conducting membrane with an electrode arranged on either side of it (anode and cathode). Moreover, gas diffusion layers (GDL) may be arranged on both sides of the membrane electrode assembly, on the sides of the electrodes facing away from the membrane. In the operation of the fuel cell device with a plurality of fuel cells put together to form a fuel cell stack, the fuel, especially hydrogen ($H_2$) or a hydrogen-containing gas mixture, is supplied to the anode, where an electrochemical oxidation of $H_2$ to form $H^+$ takes place, giving off electrons. Across the membrane, which electrically insulates and separates the reaction spaces from each other, there occurs a water-bound or water-free transport of the protons $H^+$ from the anode space to the cathode space. The electrons provided at the anode are conveyed across an electrical line to the cathode. The cathode is supplied with oxygen or an oxygen-containing gas mixture, so that a reduction of $O_2$ to $O^{2-}$ occurs, taking up electrons. At the same time, the oxygen anions in the cathode space react with the protons transported across the membrane to form water.

This water needs to be drained out from the fuel cell and the fuel cell stack, until a moisture level necessary for the operation of the fuel cell device is achieved.

Fuel cell devices are used in the most diverse of systems, for example in motor vehicles, in commercial vehicles, or even in household appliances, so that many different requirements are placed on each individual unit cell formed from a distribution plate comprising media channels and a membrane electrode assembly. Between every two adjacent distribution plates, which together can form a bipolar plate, a cooling medium typically also flows to the suitable temperature control of the fuel cell stack. The three media, namely, the fuel, the cathode gas, and the coolant, are taken separately from each other to the respective active regions of the unit cells, the supply and the drainage occurring through so-called media guides. This supplying and draining of each medium to or from the active region of the cell occurs perpendicular to the stacking direction of a fuel cell stack.

One such media guide or one such "external header" can be found, for example, in DE 10 2017 210 263 A1, being arranged laterally on a plurality of fuel cells of the same design, stacked on top of each other, in order to guide a medium laterally, i.e., perpendicular with respect to the stacking direction, into the active regions. The media guide is associated with a piezoelement, which his adapted to establish a flow cross section in the lateral direction, by which the supplying and the 10 draining of media can be optimized in flexible manner.

DE 10 2014 220 682 A1 likewise describes a fuel cell stack having an element which can be inserted in a media port, the element having a shape which produces a suitable distribution of the medium among the unit cells. These inserts in the supply openings serve to equalize the pressure distribution of the medium respectively supplied to and drained from the unit cell.

A fuel cell stack is also described in US 2011/0244353 A1, comprising media ports in which an adjustable element can be inserted in order to provide an equal distribution of the pressure for the medium. This pressure distribution can be adjusted variably by shifting the individual elements in order to narrow the cross section of the media guide.

In U.S. Pat. No. 8,227,132 B2 there is described a fuel cell stack, likewise associated with "headers", making possible a supplying and draining of media in sideways direction, and thus laterally with respect to the stacking direction.

The mounting of external "headers" has the advantage that the bipolar plates can have smaller dimensions in their design, since there are no media ports. Thus, the costly material for bipolar plates can be economized, since the external media guides, which are arranged laterally on the fuel cell stack, can be made from a cheaper material. Furthermore, the costliest part of any fuel cell is the active surface, which is used to generate a current. Hence, it is desirable to produce unit cells of the same design. Different power classes can then be handled by stacking the unit cells in different numbers.

BRIEF SUMMARY

Some embodiments provide a kit for a fuel cell stack as well as a method for the production of a fuel cell stack for a fuel cell device with which the fuel cell stack can easily be adapted to different power conditions.

The kit comprises in particular a first plurality of unit cells of the same design, which can be stacked on top of each other in a stacking direction and which each have one or more media channels and a membrane electrode assembly, the membrane electrode assembly comprising a cathode, an anode, and a membrane arranged between the cathode and the anode. Moreover, the kit comprises a first media guide, which can be laterally connected to the first plurality of unit cells and runs parallel to the stacking direction, having a first usable flow cross section, in order to guide a medium into or out from the media channels of the unit cells of the first plurality of unit cells substantially laterally with respect to the stacking direction. Moreover, the kit comprises a second plurality of unit cells of the same design and a second media guide, which can be connected laterally to the two pluralities of unit cells stacked on top of one another and running parallel to the stacking direction, having a second usable flow cross section, different from the first usable flow cross section, in order to guide a medium into or out from the media channels of the unit cells of the two pluralities of unit cells substantially laterally to the stacking direction.

The use of different geometries in the external "headers", i.e., the laterally attachable media guides, means that the media supply process of the stack can be optimally designed for every power class with no compromises. Since higher power classes of a fuel cell device mean higher media consumption, each media supply and/or media drain is optimized in that, for larger power classes, the external media guides with a larger conduit cross section may be mounted on the stacked unit cells.

For an optimal media supply, it may be advantageous for the first usable flow cross section of the first media guide to be smaller than the second usable flow cross section of the second media guide.

In order to adapt each media supply and each media drain depending on the number of stacked unit cells of the same design, a plurality of first media guides and a plurality of second media guides may be present. The first media guides are formed from a first fuel supply and a first fuel drain, a first cathode gas supply and a first cathode gas drain, and a first coolant supply and a first coolant drain. The second media guides, in turn, may be formed from a second fuel supply and a second fuel drain. The second media guides may furthermore comprise a second cathode gas supply and a second cathode gas drain, and a second coolant supply and a second coolant drain. All of the second media guides may have a larger usable flow cross section than is the case for the first media guides.

An optimized supplying of the active surface of the stacked unit cells can be achieved, for example, in that the first fuel supply and the second fuel supply can be connected to a first short edge of the stacked unit cells, and the first fuel drain and the second fuel drain can be connected to a second short edge of the stacked unit cells. Thus, for example, the rectangular shaped unit cells are provided with media channels which extend up to the respective plate edge of the unit cells, and the fuel supply runs from the first short edge across the active region to the second short edge of the unit cells.

In order to achieve a cross flow principle between the fuel and the cathode gas, the first cathode gas supply and the second cathode gas supply may be connectible to a first long edge of the stacked unit cells. and the first cathode gas drain and the second cathode gas drain to be connectible to a second long edge of the stacked unit cells. The cathode gas supply can be deflected in this case, so that the cathode gas supplies and the cathode gas drains are arranged offset at the two opposite long edges.

As already explained for the cathode gas supply process, it is also possible for the coolant supply process that the first coolant supply and the second coolant supply can be connected to a first long edge of the stacked unit cells, and the first coolant drain and the second coolant drain can be connected to a second long edge of the stacked unit cells. Here as well, it is possible for the coolant to undergo a deflection, so that the coolant supply at the first long edge is arranged opposite, but with an offset, to the coolant drain located at the second long edge.

Oftentimes it is not necessary for the usable flow cross sections for the coolant supply process or for the cathode gas supply process to vary precisely as is necessary for example for the fuel supply process, depending on the number of stackable unit cells of the same design. In this regard, the ratio of the first usable flow cross section and the second usable flow cross section of the fuel supplies and/or the fuel drains may be different from the ratio of the first usable flow cross section and second usable flow cross section of the cathode gas supplies and/or the cathode gas drains. In this way, further design space can be economized.

In order to adapt the fuel cell stack, whether formed from only the first plurality of unit cells or also formed from the first plurality of unit cells and the second plurality of unit cells, to the existing design space conditions, the usable flow cross sections of the cathode gas supply and/or the cathode gas drain and/or the coolant supply and/or the coolant drain may be rectangular in shape, and the usable flow cross sections of the fuel supply and/or the fuel drain may form a circular segment, at least for a portion, or entirely.

Yet it should be mentioned in this place that configuration of the media guide and its positioning on the stacked unit cells should not be understood as being limiting. Therefore, different configurations may also exist for the media guides and/or also different positionings on the stacked unit cells.

The method for production of a fuel cell stack for a fuel cell device involves in particular the following steps:
stacking of a number of stackable unit cells of the same design, determined in dependence on the desired power capacity, along a stacking direction, the unit cells each comprising one or more media channels and a membrane electrode assembly, which comprises a cathode, an anode, and a membrane arranged between the cathode and the anode,
providing or selecting at least one media guide, having a usable flow cross section depending on the previously determined number of stacked unit cells of the same design, and
attaching the at least one media guide to the stacked unit cells of the same design laterally with respect to the stacking direction.

This method has the advantage that the fuel cell stack can be easily produced, such that it is adapted to the desired power capacity, the flow cross sections of the media guides being adapted to the number of stacked unit cells of the same design.

In this way, the unit cell used can remain intact, ensuring an optimal media supply for any given stack size thanks to the use of different media guides. Different power classes of the fuel cell stack can be realized by different numbers of stacked unit cells.

In order to secure each media guide at a predetermined location of the fuel cell stack, the stackable unit cells of the same design may have a pair of parallel arranged receiving slots running in the stacking direction, a free end of the at least one media guide being accommodated in each receiving slot, and at least one of the receiving slots comprising a latch seat in which a latch situated on at least one of the free ends is accommodated, especially in form-fitting manner.

Thanks to the use of a latching device formed from a latch seat and a latch, the position of the media guide can be established with respect to the plurality of stacked unit cells of the same design, especially when a form fit exists between the latch seat and the latch, active in both the lateral and the stacking direction. In one special configuration, both the latch seat and the latch are cylindrical.

The features and combinations of features mentioned above in the specification and the features and combinations of features mentioned below in the description of the figures and/or those shown only in the figures can be combined not only in the particular indicated combinations, but also in other combinations or standing alone, without leaving the scope of the invention. Thus, even configurations not discussed or shown explicitly in the figures, yet emerging from and created from the discussed configurations by separate combinations of features, should also be considered to be encompassed and disclosed by the invention.

BRIEF DESCRIPTION OF THE SEVERAL VIEWS OF THE DRAWINGS

Further advantages, features, and details will emerge from the claims, the following description, and the drawings.

It should first be pointed out that the dimensions, the size relations, and the scale of the representations shown are not fixed, but instead can vary.

DETAILED DESCRIPTION

Figure 1:
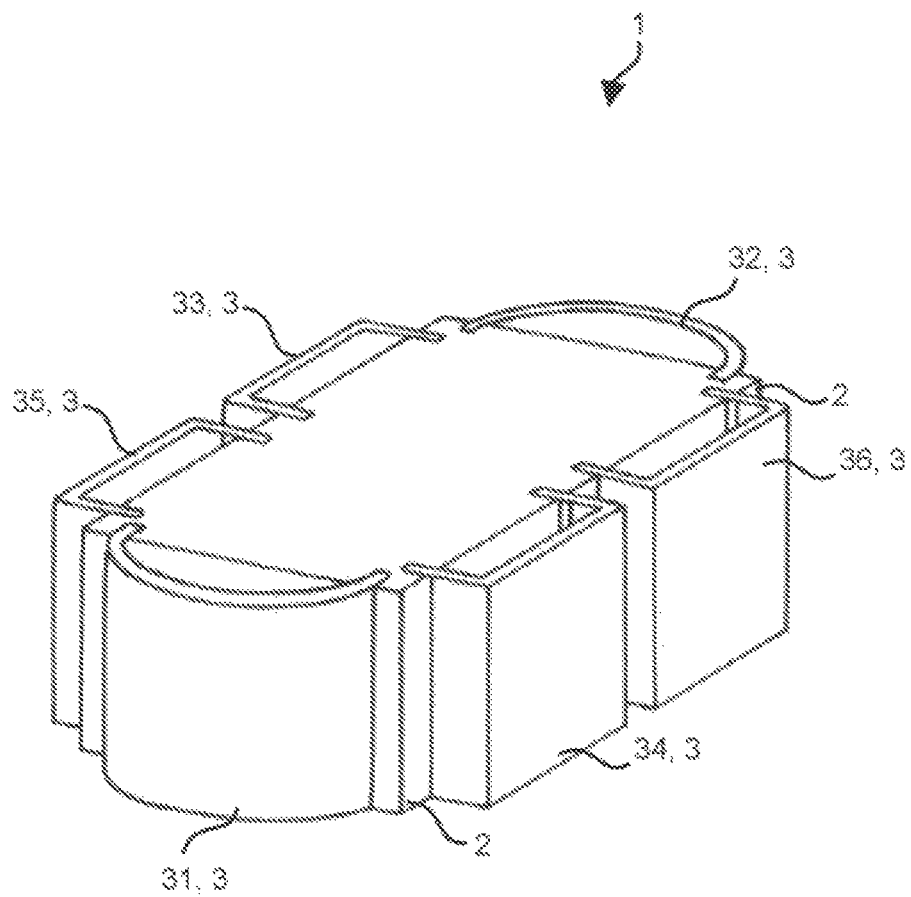
FIG. 1 shows a schematically depicted first fuel cell stack comprising a first plurality of unit cells of the same design, stacked in a stacking direction (z-direction), in a perspective view.
Figure 3:
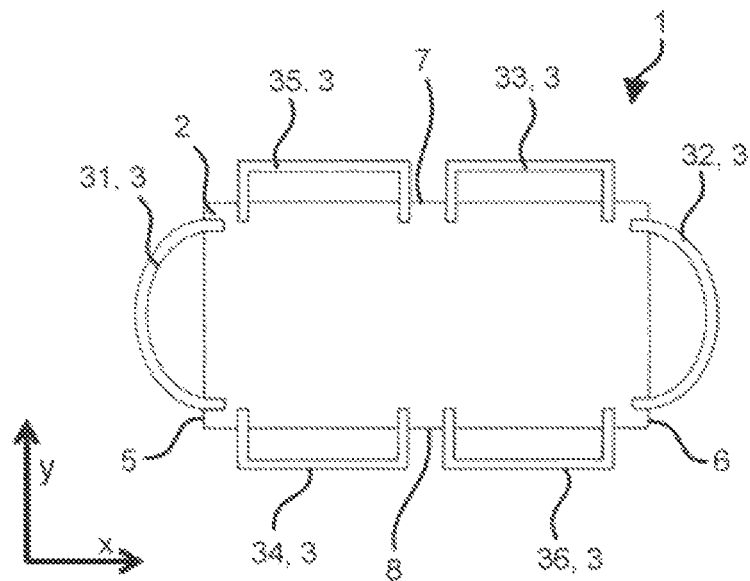
FIG. 3 shows a schematically depicted cross sectional view through the fuel cell stack of FIG. 1, perpendicular to the stacking direction.

FIGS. 1 and 3 show a first fuel cell stack 1, comprising a first plurality of unit cells 2 of the same design, stacked on top of one another in a stacking direction (z-direction), each of them having one or more media channels and a membrane electrode assembly, which comprises a cathode, an anode, and a membrane arranged between the cathode and the anode.

The fuel cell stack 1 encompasses multiple first media guides 3, laterally connected to the first plurality of unit cells 2 and running parallel to the stacking direction, each of them having a first usable flow cross section in order to guide a medium substantially laterally to the stacking direction into or out from the media channels of the unit cells 2 of the first plurality of unit cells 2.

The first media guides 3 are subdivided into a first fuel supply 31, which is arranged at a first short edge 5 of the stacked unit cells 2, and a first fuel drain 32, which is connected to the second short edge 6 of the stacked unit cells 2, situated opposite the first short edge 5.

Moreover, there is present a first cathode gas supply 33, which is connected to a first long edge 7 of the stacked unit cells 2, and a first cathode gas drain 34, which is connected to a second long edge 8 of the stacked unit cells 2, situated opposite the first long edge 7. The first cathode gas supply 33 and the first cathode gas drain 34 are arranged with an offset from each other at the long edges 7, 8, so that the air undergoes a deflection in the active region of the unit cells 2.

Moreover, the first media guides 3 encompass a first coolant supply 35, which is likewise mounted at the first long edge 7 of the stacked unit cells 2, the first media guides 3 including in addition a first coolant drain 36, which is likewise mounted at the second long edge 8 of the stacked unit cells 2 and arranged with an offset to the first coolant supply 35.

Figure 2:
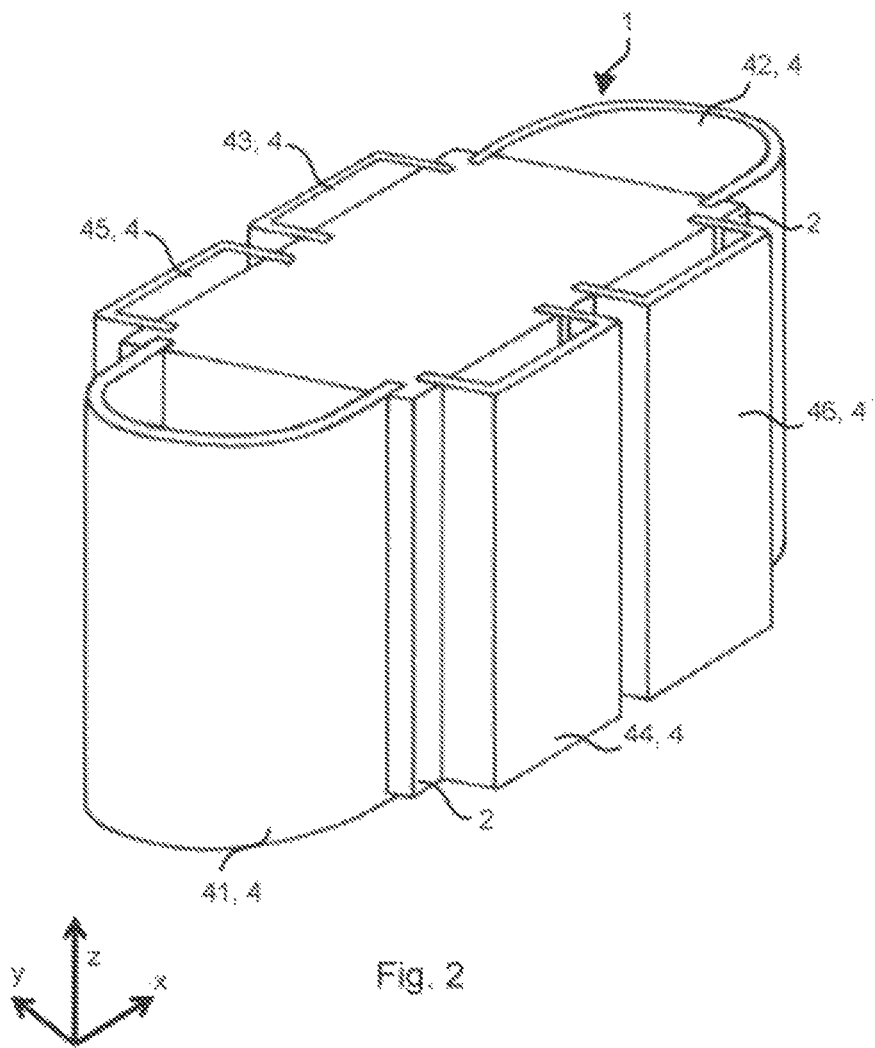
FIG. 2 shows a schematically depicted second fuel cell stack comprising the first plurality of unit cells of the same design, stacked in a stacking direction, and a second plurality of unit cells, stacked onto it, in a perspective view.
Figure 4:
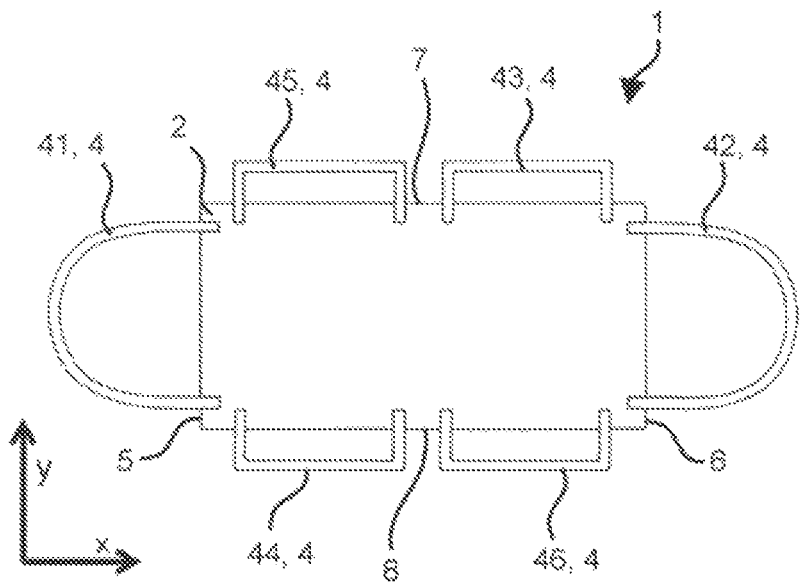
FIG. 4 shows a schematically depicted cross sectional view through the fuel cell stack of FIG. 2, perpendicular to the stacking direction.

FIGS. 2 and 4 show a second fuel cell stack 1, comprising a second plurality of unit cells 2 of the same design. This second plurality is stacked onto the first plurality of unit cells 2 of the same design that is shown in FIGS. 1 and 3. This fuel cell stack 1 also comprises multiple second media guides 4 connecting laterally to the pluralities of unit cells 2 and running parallel to the stacking direction, having a second usable flow cross section which is different from the first usable flow cross section, in order to guide a medium substantially laterally to the stacking direction into or out from the media channels of the unit cells 2 of the two pluralities of unit cells 2.

Here as well there are provided a total of six second media guides 4, the second media guides 4 being formed from a second fuel supply 41, a second fuel drain 42, a second cathode gas supply 43 and a second cathode gas drain 44, as well as a second coolant supply 45 and a second coolant drain 46. All of these second media guides 4 are mounted on the two stacked pluralities of unit cells 2 in analogous manner to the first media guides 3.

As can be noticed with the aid of the two cross sections of FIGS. 2 and 3, the usable flow cross sections of the cathode gas supply 33, 43 and the cathode gas drain 34, 44 and the coolant supply 35, 45 and the coolant drain 36, 46 are rectangular. The usable flow cross sections of the fuel supplies 31, 41 and the fuel drains 32, 42 are in the shape of a cylindrical segment.

Figure 5:
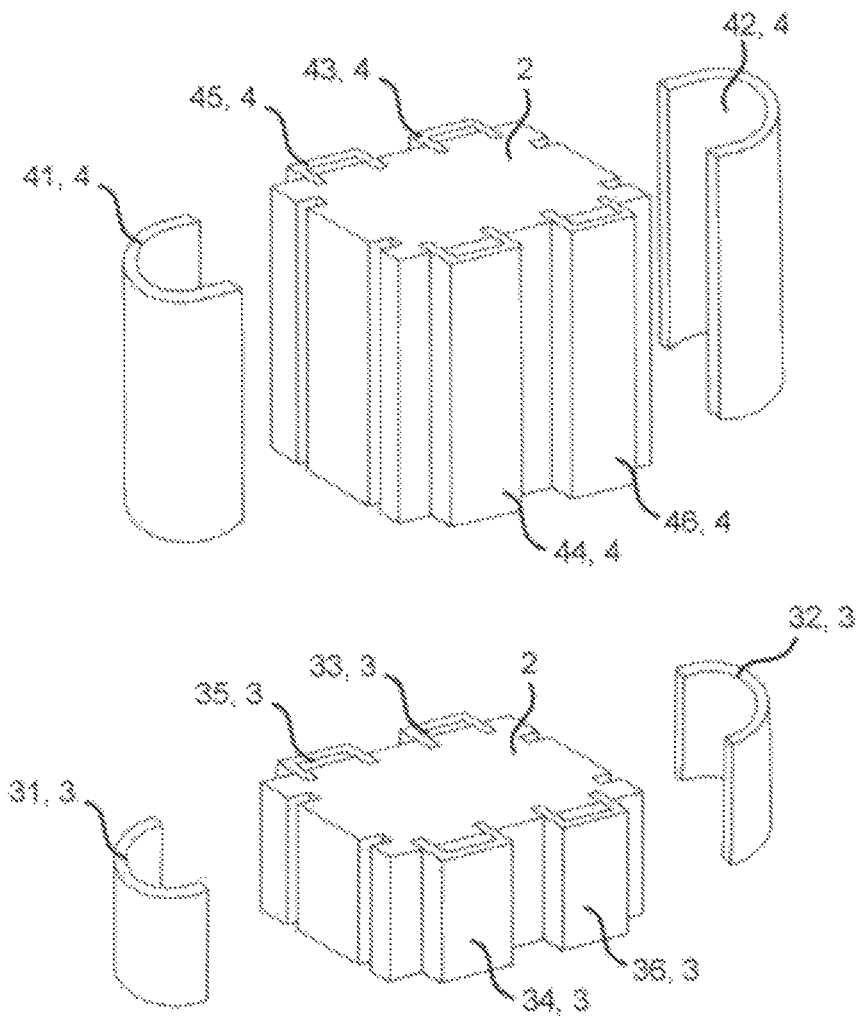
FIG. 5 shows a kit to form the fuel cell stack of FIG. 1 and the fuel cell stack of FIG. 2.

FIG. 5 shows a kit for the two above explained fuel cell stacks 1, encompassing the first plurality of unit cells 2 of the same design, stacked on top of each other in a stacking direction, each of them comprising one or more media channels and a membrane electrode assembly, which comprises a cathode, an anode, and a membrane arranged between the cathode and the anode. The kit furthermore encompasses a total of six first media guides 3 which can be connected laterally to the first plurality of unit cells 2 and which run parallel to the stacking direction, having a first usable flow cross section in order to guide a medium substantially laterally to the stacking direction into or out from the media channels of the unit cells 2 of the first plurality of unit cells 2.

The first media guides 3 are subdivided into a first fuel supply 31, which is arranged at a first short edge 5 of the stacked unit cells 2, and a first fuel drain 32, which is connected to the second short edge 6 of the stacked unit cells, situated opposite the first short edge 5.

Moreover, there is present—not shown for sake of clarity—a first cathode gas supply 33, which can be connected to a first long edge 7 of the stacked unit cells 2, and a first cathode gas drain 34—likewise not shown for sake of clarity—which can be connected to a second long edge 8 of the stacked unit cells 2, situated opposite the first long edge 7. The first cathode gas supply 33 and the first cathode gas drain 34 are arranged with an offset from each other at the long edges 7, 8, so that the air undergoes a deflection in the active region of the unit cells 2.

Moreover, the first media guides 3 encompass a first coolant supply 35—not otherwise shown for sake of clarity—which is likewise mounted at the first long edge 7 of the stacked unit cells 2, the first media guides 3 including in addition a first coolant drain 36—likewise not otherwise shown for sake of clarity—which can likewise be mounted at the second long edge 8 of the stacked unit cells 2 and arranged with an offset to the first coolant supply 35.

The kit furthermore encompasses a second plurality of unit cells 2 of the same design. Moreover, the kit encompasses a second media guide 4 which can be connected laterally to the two pluralities of unit cells 2 stacked on top of each other and running parallel to the stacking direction, having a second usable flow cross section different from the first usable flow cross section in order to likewise guide a medium substantially laterally to the stacking direction into or out from the media channels of the unit cells 2 of the two pluralities of unit cells 2.

Here as well there are provided for the kit a total of six second media guides 4, the second media guides 4 being formed from a second fuel supply 41, a second fuel drain 42, a second cathode gas supply 43—not otherwise shown for sake of clarity—and a second cathode gas drain 44—likewise not otherwise shown for sake of clarity—as well as a second coolant supply 45—not otherwise shown for sake of clarity—and a second coolant drain 46—likewise not otherwise shown for sake of clarity. All of these second media guides 4 are mounted on the two stacked pluralities of unit cells 2 in analogous manner to the first media guides 3.

Since it is not necessary for the flow cross section to vary to the same degree with the number of unit cells 2 present in the stack, both for the coolant supply process and for the fuel supply process or for the cathode gas supply process, the ratio of the first usable flow cross section and the second usable flow cross section of the fuel supplies 31, 41 and/or the fuel drains 32, 42 may be different from the ratio of the first usable flow cross section and second usable flow cross section of the cathode gas supplies 33, 43 and/or the cathode gas drains 34, 44.

A fuel cell stack 1 according to FIGS. 1 to 4 for a fuel cell device can be produced by the following steps:

stacking of a number of stackable unit cells 2 of the same design, determined in dependence on the desired power capacity, along a stacking direction, the unit cells 2 each comprising one or more media channels, may extend as far as the edge of the plate, and a membrane electrode assembly, which comprises a cathode, an anode, and a membrane arranged between the cathode and the anode, providing or selecting at least one media guide 4, having a usable flow cross section depending on the previously determined number of stacked unit cells 2 of the same design, and attaching the at least one media guide 4 to the stacked unit cells 2 of the same design laterally with respect to the stacking direction.

Figure 6:
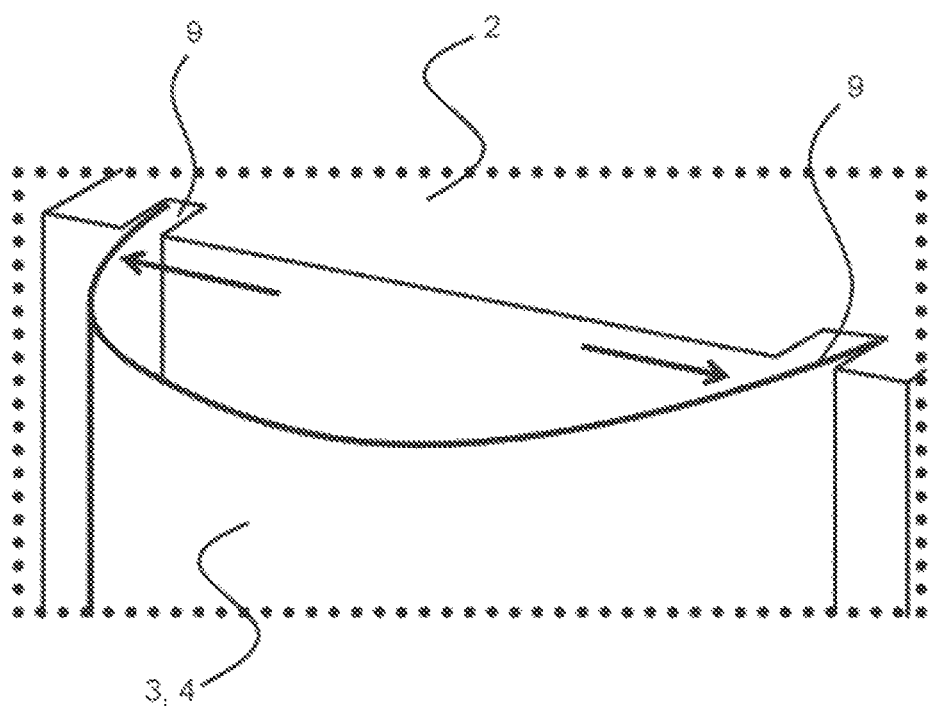
FIG. 6 shows a perspective detail view of the fuel cell stack of FIG. 1 or 2.
Figure 7:
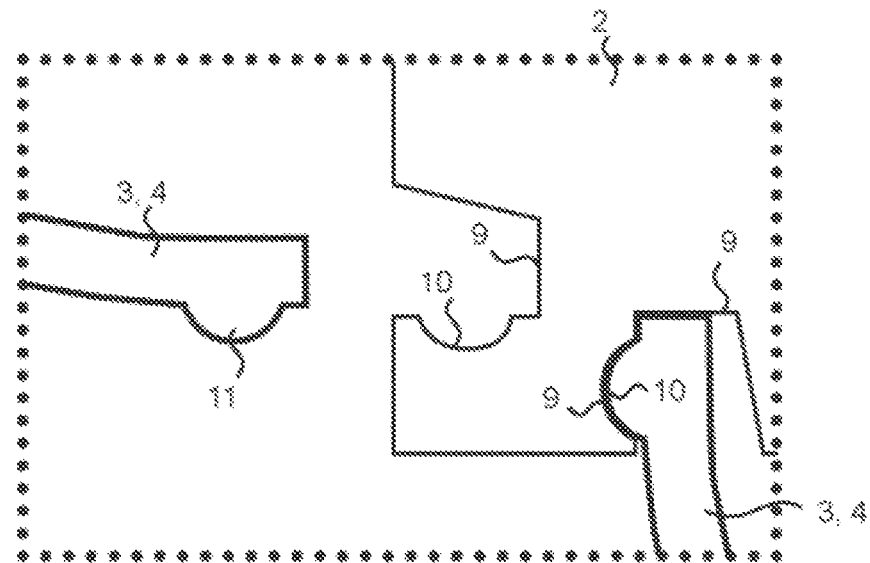
FIG. 7 shows a detail view of one of the receiving slots to accommodate a free end of a media guide.
Figure 8:
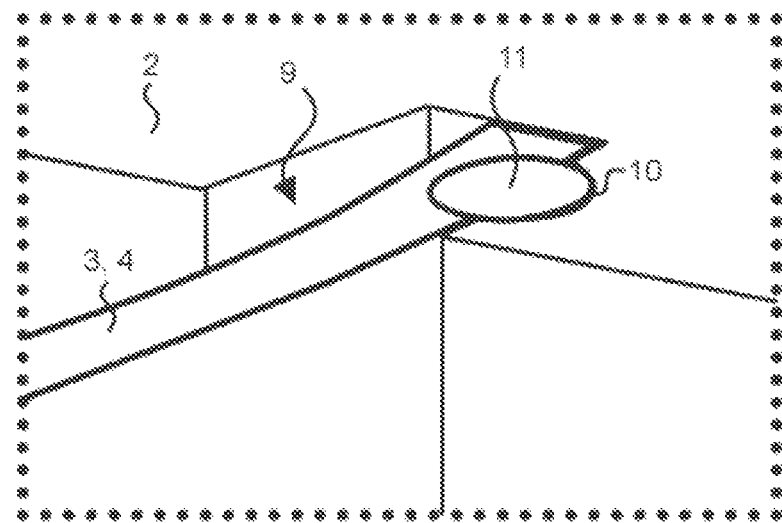
FIG. 8 shows another detail view of the receiving slot with a free end of the media guide inserted in it.

With the aid of FIGS. 6 and 7 it will be noticed that the stackable unit cells 2 of the same design each comprise a pair of parallel arranged receiving slots 9 running in the stacking direction, each receiving slot 9 accommodating a free end of the at least one media guide 3. It may be advantageous for the media guides 3, 4 to be inserted into the receiving slots 9 with a pretension, so that there is a better attachment to the stack of unit cells 2. In addition, the pressure of the medium can bring about a securing of the media guide 3, 4, since a force will be acting according to the two arrows shown. For this reason, the media guides 3, 4 may be elastically resilient.

With the aid of FIG. 7 it will be noticed that at least one, but in particular both of the receiving slots 9 have at least one latch seat 10, which can accommodate a latch 11, arranged at least at one of the free ends, or at both free ends. The latching realized by the latch seats 10 and the latches 11 is formed by a form fit, acting in both the lateral and the stacking direction, so that the position of the media guides 3, 4 is established thanks to the latching with respect to the stack of unit cells 2 of the same design.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A kit for a fuel cell stack, comprising:
a first plurality of unit cells of the same design, which can be stacked on top of each other in a stacking direction to form a first stack of unit cells of a first height, and which each have one or more media channels and a membrane electrode assembly, the membrane electrode assembly comprising a cathode, an anode, and a membrane arranged between the cathode and the anode;
a first media guide associated with the first stack of unit cells of the first height and having a first height correlated to the first height of the first stack of unit cells, which first media guide can be laterally connected to the first plurality of unit cells and runs parallel to the stacking direction, the first media guide having a first usable flow cross section, in order to guide a medium of a first media type into or out from the media channels of the unit cells of the first plurality of unit cells substantially laterally with respect to the stacking direction;
a second plurality of unit cells of the same design, which can be stacked on top of each other and the first plurality of unit cells of the same design to form a second stack of unit cells of a second height that is different than the first height; and
a second media guide associated with the second stack of unit cells of the second height and having a second height correlated to the second height of the second stack of unit cells which is greater than the first height of the first media guide, which second media guide can be connected laterally to the first and second pluralities of unit cells stacked on top of one another and running parallel to the stacking direction in replacement of the first media guide, the second media guide having a second usable flow cross section that is different from the first usable flow cross section of the first media guide, in order to guide the medium of the first media type into or out from the media channels of the unit cells of the first and second pluralities of unit cells substantially laterally to the stacking direction.

2. The kit according to claim 1, wherein the first usable flow cross section of the first media guide is smaller than the second usable flow cross section of the second media guide.

3. The kit according to claim 1, wherein a plurality of first media guides and a plurality of second media guides are present, the first media guides being formed from a first fuel supply and a first fuel drain, a first cathode gas supply and a first cathode gas drain, and a first coolant supply and a first coolant drain, and the second media guides being formed from a second fuel supply and a second fuel drain, a second cathode gas supply and a second cathode gas drain, and a second coolant supply and a second coolant drain.

4. The kit according to claim 3, wherein the first fuel supply and the second fuel supply can be connected to a first short edge of the stacked unit cells, and the first fuel drain and the second fuel drain can be connected to a second short edge of the stacked unit cells.

5. The kit according to claim 3, wherein the first cathode gas supply and the second cathode gas supply can be connected to a first long edge of the stacked unit cells, and the first cathode gas drain and the second cathode gas drain can be connected to a second long edge of the stacked unit cells.

6. The kit according to claim 3, wherein the first coolant supply and the second coolant supply can be connected to a first long edge of the stacked unit cells, and the first coolant drain and the second coolant drain can be connected to a second long edge of the stacked unit cells.

7. The kit according to claim 3, wherein the ratio of the first usable flow cross section and the second usable flow cross section of the fuel supplies and/or the fuel drains is different from the ratio of the first usable flow cross section and second usable flow cross section of the cathode gas supplies and/or the cathode gas drains.

8. The kit according to claim 3, wherein the usable flow cross sections of the cathode gas supply and/or the cathode gas drain and/or the coolant supply and/or the coolant drain are rectangular in shape, and the usable flow cross sections of the fuel supply and/or the fuel drain form a circular segment at least for a portion.

9. A method for production of a fuel cell stack for a fuel cell device, comprising:
   stacking of a number of stackable unit cells of the same design, determined in dependence on the desired power capacity, along a stacking direction, the unit cells each comprising one or more media channels and a membrane electrode assembly, which comprises a cathode, an anode, and a membrane arranged between the cathode and the anode;
   selecting a first media guide for a first media type from among a plurality of media guides of different lengths and different usable flow cross sections for the first media type, the plurality of media guides including at least a first media guide having a first height correlated to a first height of a first stack of the stackable unit cells and at least a second media guide having a second height correlated to a second height of a second stack of the stackable unit cells, wherein the second height is different than the first height, and wherein the selected media guide has a usable flow cross section that is dependent on the previously determined number of stacked unit cells of the same design; and
   attaching the selected media guide for the first media type to the stacked unit cells of the same design laterally with respect to the stacking direction.

10. The method according to claim 9, wherein the stackable unit cells of the same design have a pair of parallel arranged receiving slots running in the stacking direction, a free end of the at least one media guide is accommodated in each receiving slot, and at least one of the receiving slots comprises a latch seat in which a latch situated on at least one of the free ends is accommodated.

* * * * *